United States Patent Office

3,299,043
Patented Jan. 17, 1967

3,299,043
PROCESS FOR PREPARING POLYNUCLEOTIDES
Gerhard Schramm, Tübingen, Horst Grötsch, Frankfurt am Main, and Wolfgang Pollmann, Sinzheim, Baden, Germany, assignors to Farbwerke Hoechst Aktiengesellschaft vormals Meister Lucius & Bruning, Frankfurt am Main, Germany, a corporation of Germany
No Drawing. Filed July 9, 1964, Ser. No. 381,532
Claims priority, application Germany, May 24, 1961, F 33,984
5 Claims. (Cl. 260—211.5)

The present invention relates to a process for preparing polynucleotides from nucleosides or nucleotides in the presence of polyphosphoric acid esters.

This application is a continuation-in-part of our earlier copending application Ser. No. 196,443 filed May 21, 1962. and now abandoned.

It is known that oligonucleotides can be prepared by reacting nucleoside monophosphates, for instance, thymidylic acid, with dicyclohexyl-carbodiimide and then condensing the activated phosphates to oligonucleotides. However, when proceeding in this way, an average degree of polymerization of 3 to 4 was only reached, and the yields did not exceed 5%. (Khorana et al., J. Am. Chem. Soc. 80, 6223 (1958).)

It is likewise known that nucleotides can be converted into the cyclic 2',3'-phosphates by means of tetraphenyl-pyrophosphate or diphenyl-phosphorochloridate in anhydrous dioxane with addition of tri-n-butylamine. By treating certain ammonium salts of said cyclic phosphates with a further quantity of tetra-phenyl-pyrophosphate, oligonucleotides are obtained that likewise show a maximum length of chain of 12 nucleotides only. (Michelson, J. Chem. Soc. (London) 1371, 3655 (1959).)

Furthermore, Cramer (Angew. Chem. 73, 49 (1961)) describes a method of condensing nucleotides by drying the nucleotides and reacting them in absolute dimethylformamide and tri-n-butylamine with the enol-phosphate of malonic acid ester. By operating in this way there is obtained, for instance, an adenosine-diethyl-pyrophosphoric acid ester which may then be condensed into polyadenylic acid. By said method a poly-thymidylic acid was produced that contained as a maximum 5 units of nucleotides. The yield amounted to only 3%.

It may, in summary, be stated that when applying the known methods, low yields and very low degrees of polymerization are obtained. Cyclic oligonucleotides are primarily formed as undesired by-products.

Now we have found that polynucleotides may be obtained in good yield and in a simple manner by causing a cyclic polyphosphoric acid lower alkyl ester to act on nucleotides or nucleosides, especially the N-glycosides of pyrimidine and purine. In this specification, the terms "pyrimidine" and "purine" include both the mother substances pyrimidine and purine, and derivatives thereof.

As starting substances for the manufacture of polynucleotides, nucleosides such as adenosine, guanosine, uridine, cytidine, neubularine, cordycepin-2,6-diamino purine riboside, mercaptopurine-riboside, aza-adenine-riboside, 8-aza-guanine-riboside and aza-urazil-riboside, inosine, isoguanine-riboside, xanthosine and uric acid riboside, desoxy-nucleosides such as desoxy adenosine, desoxy-guanosine, desoxy-cytidine and thymidine may be used. Other starting materials include nucleotides, above all nucleoside-monophosphates, for instance, a mixture of adenosine-2'-phosphate and adenosine-3'-phosphate, adenosine-5'-phosphate or the cyclic adenosine-2',3'-phosphate. In addition to other purine nucleotides such as guanylic acid, various pyrimidine nucleotides such as uridylic acid, cytidylic acid, thymidylic acid, 5-chloruridylic acid, 5-bromuridylic acid, 5-ioduridylic acid, aza-uridylic acid, 2-thiouridylic acid, 5-hydroxy-methyl-cytidylic acid, and 2-thio-cytidylic acid can also be used. It should be emphasized that the sensitive desoxy-nucleotides, for instance, desoxy-adenylic acid, desoxy-guanylic acid, desoxy-cytidylic acid and desoxy-thymidylic acid may likewise be used as starting material. In addition to the natural nucleotides, various synthetic products may be used which can be obtained according to the method indicated in Chem. Ber. volume 93 (1960), page 140, or by causing an excess amount of a substituted or unsubstituted heterocyclic nitrogen base having a hydrogen atom on the nitrogen atom to act on sugar in the presence of a cyclic polyphosphoric acid lower alkyl ester. These synthetic nucleosides can be phosphorylated according to known methods in order to obtain corresponding nucleotides. It is, however, likewise possible to phosphorylate and condense the nucleosides directly in one reaction with an excess amount of cyclic polyphosphoric acid lower alkyl ester. When proceeding in this way, the yields are in most cases smaller than those obtained by starting from the finished nucleotides.

Mixtures of nucleotides can likewise be used as starting substances and in this way high-molecular weight nucleic acids are obtained in good yields.

The cyclic polyphosphoric acid lower alkyl esters (metaphosphoric acid lower alkyl esters) used as condensing agents according to the invention can be prepared, for instance, from phosphorus pentoxide and alkoxyl compounds according to "Berichte der Deutschen Chemischen Gesellschaft," volume 43 (1910), page 1857.

It is said in Liebigs Ann. Chem. 572 (1952), page 173–189, that this reaction produces a mixture of isometaphosphoric acid ethyl ester and tetrametaphosphoric acid ethyl ester. Besides the ethyl esters, methyl esters, propyl esters and isopropyl esters can be used.

The process according to the invention is suitably carried out by admixing the substance to be condensed with the cyclic-phosphoric acid alkyl esters and by heating the viscous mass with slight rotation of the reaction vessel. A solvent is not required. However, if the starting materials are slightly soluble, the reaction is facilitated by adding a small amount of dimethylformamide or phosphoric acid tris-dimethyl-amide, or by using a supersonic generator. In case desoxy-nucleosides and desoxy-nucleotides are reacted, it is suitable to add a small amount of pyridine or a trialkylamine the alkyl group of which has 2–8 C-atoms, such as triethylamine, tri-n-propylamine, tri-n-butylamine or tri-n-octylamine in order to facilitate the reaction. The temperatures and reaction times to be used, depend, of course, on the chemical nature of the starting materials, the reactivity of the nucleosides and nucleotides being very different. In general, temperatures between 20 and 60° C. have proved suitable. The reaction is usually completed after 10–20 hours. However, in case the starting material is sensitive to elevated temperatures and has to be reacted at room temperature, the reaction might even require up to 14 days.

The reaction mixture can be suitably worked up by adding water to the batch and dialysing the latter against water in order to remove the phosphoric acid. After dialysis of the remaining solution the polynucleotide is suitably isolated by lyophilization or precipitation by means of alcohol. It is likewise possible to precipitate the polynucleotide directly from the batch by adding alcohol. The reaction products have a degree of polymerization of 50 to 300.

In comparison with the known methods of preparing oligo-nucleotides the process of the present invention shows the advantage that, for the first time, higher degrees of polymerization can be reached together with good yields. From the technical point of view the process of the present invention can be realized in a remarkably simpler manner than the known condensation processes. A further advantage is that a low degree of humidity does not affect the reaction so that troublesome drying processes may be dispensed with. In the above-described way it was, for the first time, possible to obtain products which reacted like natural nucleic acids with regard to alkaline hyperchromia and helix formation. The term "hyperchromia" is elucidated in detail in Example 1.

Because nucleic acids as carriers of the gene properties exert a considerable influence on cell metabolism, the products can be used as cytostatics, for instance, as inhibitors for bacteria, or for the transformation of organisms, for instance for the production of virus mutants. The products obtained according to the process of the present invention may be used as adjuvants in immunization in order to increase the antigen titer.

The following examples serve to illustrate the invention but they are not intended to limit it thereto:

EXAMPLE 1

*Preparation of poly-adenylic acid from adenosine-2'-monophosphate and adenosine-3'-monophosphate adenylic acid)*

350 milligrams of adenylic acid prepared by hydrolysis of ribonucleic acid are mixed with 8 grams of cyclic polyphosphoric acid ethyl ester and heated for 18 hours in a rotating flask immersed in an oil bath of 55° C., whereby the adenylic acid is dissolved. After cooling of the reaction mixture the latter is dissolved in 75 cc. of water and dialysed for 4 days against water in order to remove the orthophosphate that has formed and oligonucleotides of low molecular weight. The solution remaining in the dialysis bag is lyophilized. The yield in high-molecular poly-adenylic acid amounts to 15%.

If the above-described reaction is carried out with addition of 2 cc. of pyridine, the yield is increased to 20%. In the ultra centrifuge the polyadenylic acid thus obtained, when used in a solution of 1% strength, has a sediment constant $s_{20}=2.5$ and a diffusion constant $D_{20}=12$. From this data, a molecular weight of more than 20,000 is calculated, corresponding to a degree of polymerization exceeding 60. As further evidence of the high-molecular weight nature of polyadenylic acid, a characteristic increase in the optical extinction of the material (hyperchromia) is observed after alkaline hydrolysis. It is known that the extinction of ultraviolet light by natural nucleic acids due to hydrogen linkages is less than that which would be expected by adding the characteristic extinction of the individual members of the chain. After alkaline hydrolysis of the high-molecular nucleic acids the extinction, therefore, increases at 260 mu. The synthetic polyadenylic acid showed a hyperchromia of 40–50%. Pictures of the preparation taken with the aid of the electron microscope show long threadlike structures similar to those of natural ribonucleic acid.

EXAMPLE 2

*Preparation of polyadenylic acid from adenosine*

As described in Example 1, 350 milligrams of adenosine are heated with 10 grams of cyclic polyphosphoric acid ethyl ester in the oil bath (temperature of the bath 55° C.). After working up and dialysis there is likewise obtained a polyadenylic acid whose properties correspond to those of the above-mentioned preparation. The yield amounts to about 10%.

EXAMPLE 3

*Preparation of polythymidylic acid from 2'-desoxy-thymidine-5'-phosphate*

100 milligrams of commercial thymidylic acid prepared from desoxy-ribonucleic acid (DNS) are heated with 8 grams of cyclic polyphosphoric acid ethyl ester for 2 hours to 55° C., with rotation. The reaction is continued for a further 12 hours at room temperature. After working up of the substance in the above-described manner, high-molecular, non-dialysable polythymidylic acid is obtained in a yield of 6%.

$s_{20}=2.0; D_{20}=11$

From the sedimentation constant and the diffusion constant, a molecular weight of more than 20,000 is indicated. Hyperchromia: 62%. The polythymidylic acid obtained is attacked by ribonuclease indicating that the reaction product is, to a large extent, similar to the corresponding natural product as regards its steric structure.

EXAMPLE 4

In a manner analogous to that described in Example 1, 200 milligrams of commercial cytidylic acid are condensed in the presence of 10 grams of cyclic polyphosphoric acid ethyl ester. After working up of the reaction mixture in the above-described manner, polycytidylic acid showing a hyperchromia of 25% is obtained in a yield of 18%

$s_{20}=2.4; D_{20}=11$; molecular weight about 25,000

EXAMPLE 5

By causing 10 grams of cyclic polyphoric acid ethyl ester to act on 200 milligrams of commercial uridylic acid and working up of the reaction mixture in a manner analogous to that described in Example 4, polyuridylic acid is obtained in a yield of 15%. The acid is smoothly cleaved by ribonuclease.

$s_{20}=4.0; D_{20}=9$; molecular weight about 90,000, corresponding with a degree of polymerization of about 300.

EXAMPLE 6

According to the method described in Example 4, 200 milligrams of guanylic acid and 10 grams of cyclic polyphosphoric acid ethyl ester are reacted and worked up. Polyguanylic acid is obtained in a yield of 10%.

$s_{20}=1.4; D_{20}=12$; molecular weight about 20,000

EXAMPLE 7

30 milligrams of desoxyadenosine-5'-phosphate were mixed with 0.2 gram of cyclic polyphosphoric acid ethyl ester and 0.2 gram of tributylamine and the mixture was heated for 36 hours to 60° C. After working up by dialysis and lyophilization, the polydesoxyadenylic acid was obtained in a yield of 22% of theory.

EXAMPLE 8

0.5 gram of cyclic polyphosphoric acid ethyl ester was mixed with 0.5 gram of tributylamine with the aid of a supersonic generator and while being weakly cooled. 30 milligrams of desoxyadenosine-5'-phosphate were added which were dissolved by renewed supersonic treatment within 5 minutes. Any possible superheating was avoided by cooling the mixture with water. The mixture was left for a fortnight at 30° C. The batch was then diluted with water, immediately neutralized by means of ammonia and the polynucleotides of high molecular weight were separated in a column of a length of 180 cm. and a diameter of 3 cm. filled with an anion exchanger. Polydesoxyadenylic acid was obtained in a yield of 45% of theory and showed a molar weight greater than 2000. The same batch to which 0.2 ml. of phosphoric acid tris-dimethylamide was added gave the same yield.

The cyclic polyphosphoric acid ethyl ester mentioned in Examples 1 to 8 was obtained according to Berichte, 43 (1910), page 1857.

We claim:

1. A process of preparing polynucleotides which comprises reacting a member selected from the group consisting of nucleotides and nucleosides with a cyclic polyphosphoric acid lower alkyl ester.

2. A process of preparing polynucleotides which comprises reacting a member selected from the group consisting of nucleotides and nucleosides with a member selected from the group consisting of isometaphosphoric acid tetraethyl ester and tetrametaphosphoric acid tetraethyl ester.

3. A process as in claim 1 wherein the nucleosides and nucleotides are N-glycosides of members selected from the group consisting of pyrimidines and purines.

4. A process as in claim 1 wherein the nucleosides and nucleotides are members selected from the group consisting of adenosine, guanosine, uridine, cytidine, thymidine, nebularine, cordycepine, 2,6-diamino-purine riboside, inosine, isoguanine-riboside, xanthosine, uric acid riboside, desoxy - adenosine, desoxy - guanosine, desoxy - cytidine, thymidine, 7 - desaza - adenine - riboside, mercaptopurine-riboside, aza-adenine-riboside, 8 - aza - guanine - riboside, aza-uracil-riboside, adenosine-2'-phosphate, adenosine-3'-phosphate, adenosine-5'-phosphate, adenosine-2',3'-phosphate, guanylic acid, uridylic acid, cytidylic acid, 5-chloruridylic acid, 5-bromuridylic acid, 5-ioduridylic acid, aza-uridylic acid, 2 - thiouridylic acid, 5 - hydroxy - methyl-cytidylic acid, 2-thiocytidylic acid, desoxy-adenylic acid, desoxy-guanylic acid, desoxy-cytidylic acid and desoxy-thymidylic acid.

5. A process as in claim 1 wherein the reactants are reacted in the presence of a member selected from the group consisting of pyridine and a tertiary aliphatic amine having 2–8 carbon atoms.

References Cited by the Examiner
UNITED STATES PATENTS

| | | | |
|---|---|---|---|
| 3,079,379 | 2/1963 | Tanaka et al. | 260—211.5 |
| 3,118,876 | 1/1964 | Ukita et al. | 260—211.5 |

LEWIS GOTTS, *Primary Examiner.*

J. R. BROWN, *Assistant Examiner.*